United States Patent [19]

Katsumata et al.

[11] Patent Number: 4,468,171
[45] Date of Patent: Aug. 28, 1984

[54] METHOD OF CONTROLLING AIR FLOW RATE OF FAN

[75] Inventors: Haruo Katsumata; Takeshi Matsuya; Hitoshi Saitoh, all of Iwaki; Shigeru Yasuki, Yokohama; Yukio Sato, Tokyo; Masaru Osaki; Minoru Komeno, both of Yokohama; Takayuki Arai, Ichikawa; Shigeki Ochi, Yokohama; Tatsuo Ino, Tokyo, all of Japan

[73] Assignees: Kureha Kagaku Kogyo Kabushiki Kaisha, Tokyo; Fuji Electric Company Limited, Kanagawa; Kawasaki Jukogyo Kabushiki Kaisha, Hyogo, all of Japan

[21] Appl. No.: 445,177

[22] Filed: Nov. 29, 1982

[30] Foreign Application Priority Data

Nov. 27, 1981 [JP] Japan ................................ 56-190088

[51] Int. Cl.³ ........................ F04B 49/06; F04B 49/00
[52] U.S. Cl. ...................................... 417/53; 417/17; 417/20

[58] Field of Search .................. 417/17, 18, 20, 26, 417/27, 43, 53

[56] References Cited

U.S. PATENT DOCUMENTS

| | | | |
|---|---|---|---|
| 4,225,289 | 9/1980 | Borkett | 417/18 |
| 4,255,089 | 3/1981 | Phillips | 417/17 |
| 4,370,098 | 1/1983 | McClain | 417/18 |

Primary Examiner—William L. Freeh
Attorney, Agent, or Firm—Wenderoth, Lind & Ponack

[57] ABSTRACT

The air flow rate of a fan driven by a motor controlled by an adjustable speed control equipment is automatically controlled by stopping the adjustable speed control equipment in response to a fault signal therefrom during operation with an inlet vane installed upstream of the fan in fully open state, simultaneously throttling the inlet vane at a preset speed to a degree of opening appropriate for the load by means of a control circuit, and, after a period for reduction of residual voltage of the motor, changing over to operation of the fan by a commercial power supply thereby to shift to control by the degree of opening of the inlet vane.

3 Claims, 11 Drawing Figures

METHOD OF CONTROLLING AIR FLOW RATE OF FAN

BACKGROUND OF THE INVENTION

This invention relates generally to control of air flow rates of blowers and fans, which will be referred to simply as "fans" hereinafter.

Among the known types of blower or fan equipment, there are one in which a great difference exists between the equipment planned capacity and the actual load and one in which a great fluctuation occurs between light load and heavy load. In such cases, it has heretofore been the common practice to bring about suitable conformity with the load by adjusting the flow rate by means such as a damper or a valve in the fan equipment.

In fan equipment of this character, however, the control loss is extremely great. For this reason, by variable-speed operation of the fan driving motor, operation under satisfactory control can be accomplished without the use of a damper or valve or, according to necessity, in conjunction with the use of a damper or valve, and a great saving in energy can be realized.

Here, the control systems enumerated below are representative examples of variable-speed control devices suitable for achieving such variable-speed operation. (1) Control by pole change motor Control system adapted to a plant operating at only two or more different speeds.

(2) Coupling control

Control system in which a coupling (eddy-current coupling or fluid coupling) is connected to the output shaft of a motor running at constant speed, and the transmission of the shaft horsepower is controlled.

(3) Primary voltage control

Control system which varies the primary voltage of the motor and controls the generated torque of the motor thereby to obtain variable speed.

(4) Secondary voltage control

Control system which uses a wound-rotor type motor and controls its secondary voltage. Secondary resistance control and Scherbius control are possible.

(5) Armature voltage control

Control system which makes use of a commutatorless motor (thyrister motor) in the case of alternating-current adjustable speed drive and a direct-current motor in the case of direct-current adjustable speed drive and controls the voltage supplied to the armature.

(6) Primary variable frequency control

Control system which supplies power of variable frequency and variable voltage to control the motor speed.

Even among these control systems, the primary frequency control system, (6), is superior as an energy-saving system since it can reduce power consumption, being capable of carrying out variable-speed control without the addition of special modifications to an existing motor and ancillary machines.

For example, when the speed of a fan motor for a boiler (forced draft fan) is controlled by a primary frequency control equipment, the power consumption of the fan is greatly reduced in comparison with that of another control system such as, for example, the system of controlling the degree of opening of an inlet vane as indicated in a graph described hereinafter. Particularly in partial-load operation, the energy-saving effectiveness of the primary frequency system is remarkably exhibited.

However, a primary frequency control equipment is accompanied by the risk of the fan tripping because of an occurrence such as disturbance of the power supply (instantaneous drop in the voltage or the like), overloading of the control device, or trouble in the device, which in turn results in the stopping of the boiler. More specifically, as described more fully hereinafter in conjunction with an accompanying time chart, when an abnormal signal from the primary frequency control equipment is received, confirmation as to whether there is residual voltage of the motor is carried out over a confirmation time of several seconds, and thereafter the fan motor is switched over to a commercial power supply. As a result, the fan motor rapidly returns to its rated speed, and, since the inlet vane is in its fully open position of this time, a large quantity of air is sent into the boiler, the combustion of which becomes unstable, whereby the boiler must unavoidably and disadvantageously be stopped.

SUMMARY OF THE INVENTION

This invention seeks to solve the above described problems by providing, in the control of the air flow rate of a fan by changing over between adjustable speed control by means of a primary frequency control equipment and inlet vane control, a method of controlling the air flow rate of the fan characterized in that fluctuation of the flow rate at the time of tripping of the fan is suppressed.

According to this invention, briefly summarized, there is provided an improved method of controlling the air flow rate of a fan with the use of a system for controlling the air flow rate of the fan, which system comprises adjustable speed control means of a motor for driving the fan, commercial power supply circuit means provided in parallel with the adjustable speed control means, and control circuit means for controlling the degree of opening of an inlet vane of the fan, said system controlling the air flow rate by changing over between variable speed control of the motor and control of the inlet vane, the improved method being characterized by the steps of stopping the adjustable speed control means during operation of the motor by the adjustable speed conrol means with the inlet vane in fully open state, simultaneously throttling the inlet vane at a preset speed to a degree of opening appropriate for the load by means of said control circuit means, and, after a time period necessary for reduction of residual voltage of the motor, changing over to operation by the commercial power supply thereby to shift to control by the inlet vane.

The nature, utility, and further features of this invention will be more clearly apparent from the following detailed description with respect to a preferred embodiment of the invention, commencing with a consideration of general aspects of the invention and concluding with specific examples of practice thereof with respect to application thereof to supplying combustion air to a boiler, when read in conjunction with the accompanying drawings, briefly described below.

DETAILED DESCRIPTION OF THE INVENTION

As conducive to a full understanding of this invention, the characteristics of a primary frequency control equipment as used heretofore—both advantageous and disadvantageous—will first be briefly described.

Figure 11:
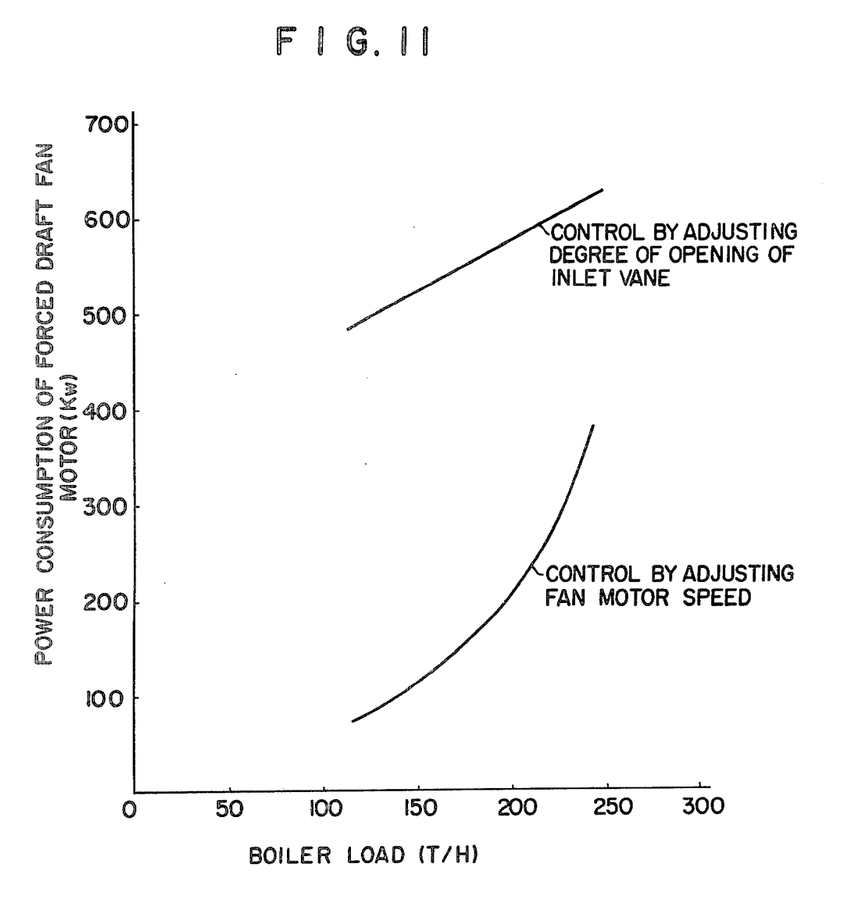
FIG. 11 is a graph indicating characteristics of fan power consumption with boiler load respectively in the case of control by the inlet vane and in the case of control of fan speed by means of a primary frequency control equipment.

As mentioned hereinbefore, when a primary frequency control equipment is used to control the speed of a fan for a boiler, the power consumption of the fan (i.e., of its motor) is much lower than that of a fan system whose flow rate is controlled by adjustment of the degree of opening of an inlet vane. This difference in power consumption is clearly indicated in FIG. 11, which is self-explanatory and also indicates that this difference is very great in partial-load operation of the boiler. It is apparent that, irrespective of the boiler load, the use of an adjustable-speed control device affords a great saving in energy.

Figure 4:
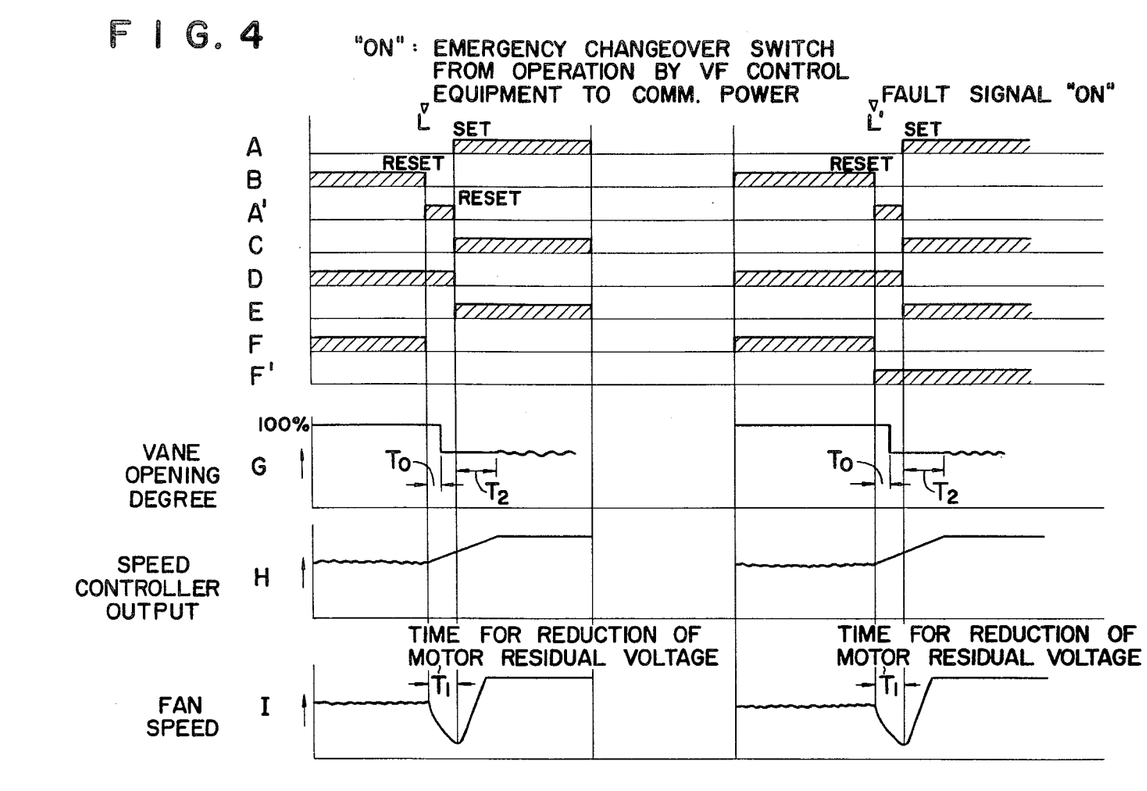
FIG. 4 is a time chart similar to FIG. 3 indicating variations of principal variables at the time of emergency changeover between fan speed control and inlet vane opening control.

On the other hand, a primary frequency control equipment is subjected to the risk of tripping of the fan, and consequent stoppage of the boiler, due to an abnormal disturbance, as mentioned hereinbefore. More specifically, as indicated in FIG. 4, which is a time chart of an emergency switching between speed control of a fan and control of an inlet vane, when a fault signal is received from the primary frequency control equipment, confirmation of reduction of residual voltage of the motor is carried out over a confirmation time of a number of seconds. Thereafter, the fan motor is switched over to a commercial power supply. As a result, the fan quickly returns to its rated speed. Since the inlet vane is fully open at this time, a large quantity of air flows into the boiler, whereby the combustion in the boiler becomes unstable, and the boiler must unavoidably be stopped. This is not desirable.

The method of controlling the air flow rate of a fan according to this invention, in which the above described problems are overcome, will now be described with respect to a preferred embodiment of the invention as applied to a fan for a boiler.

Figure 1:
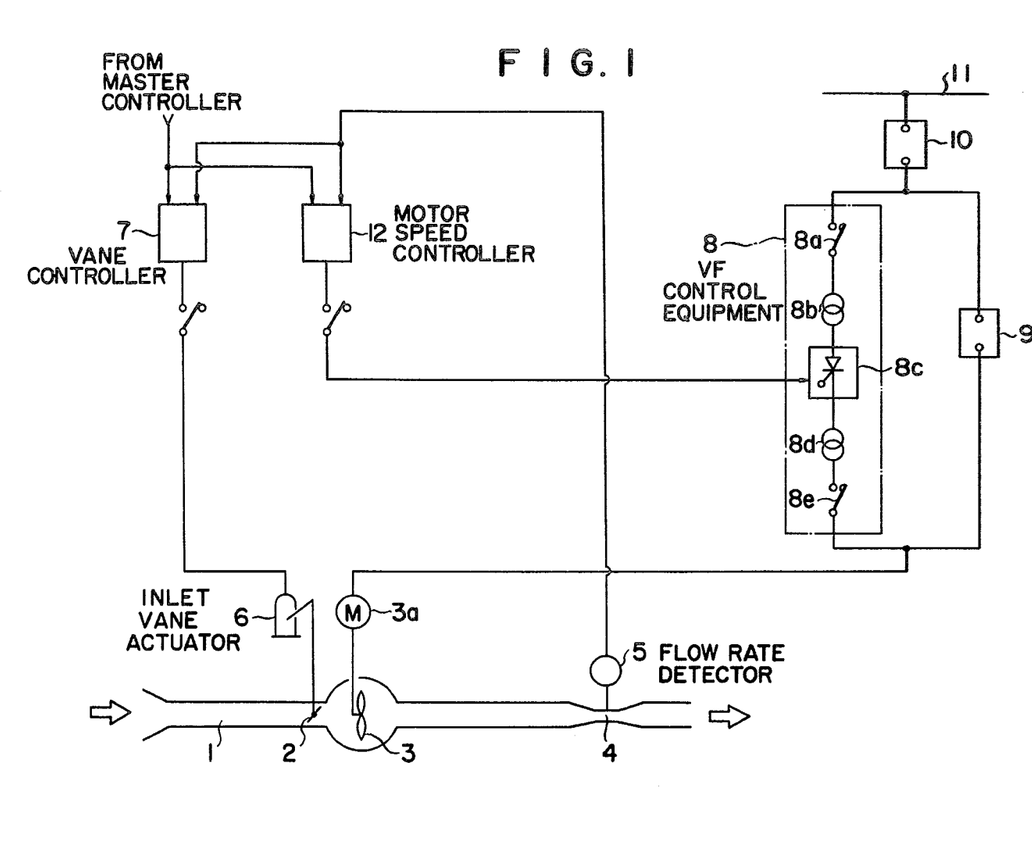
FIG. 1 is a schematic diagram, partly in circuit-diagram form, showing the essential components of a control system of a fan for practicing the method of this invention.

First, a system for practicing the method of this invention for controlling the air flow rate of a fan will be described with reference to FIG. 1. The boiler (not shown) is supplied with air through an air duct 1, at an intermediate part of which a fan 3 is installed. An inlet vane 2 is installed in the inlet of the fan 3. Downstream from the fan 3, the air duct 1 has a venturi 4, in which a flow rate detector 5 is provided. The fan 3 is driven by a motor 3a. The inlet vane 2 is actuated to vary its degree of opening by an inlet vane actuator 6, which is electrically connected to a digital-programmable controller 7 for vane control (hereinafter referred to as vane controller).

The above mentioned fan motor 3a is controlled by a primary frequency control equipment 8 (hereinafter called simply VF control equipment) comprising, in series connection, a switching contactor 8a, an input transformer 8b, a current-source inverter 8c, an output transformer 8d, and a switching contactor 8e. A circuit breaker 9 for commercial power supply is connected in parallel with the VF control equipment 8 to form a parallel-connection circuit which is connected on its input side via a circuit breaker 10 for main power supply to a main bus 11 (commercial power supply) and on its output side to the above mentioned fan motor 3a.

A digital-programmable controller 12 for speed control (hereinafter referred to as speed controller) is electrically connected on its output side to the current-source inverter 8c of the VF control equipment 8. This speed controller 12 and the above mentioned vane controller 7 are respectively connected to the above mentioned flow rate detector 5 to respectively receive air flow rate signals therefrom and are respectively connected to a master signal source (not shown) for receiving master signals therefrom.

Figure 2:
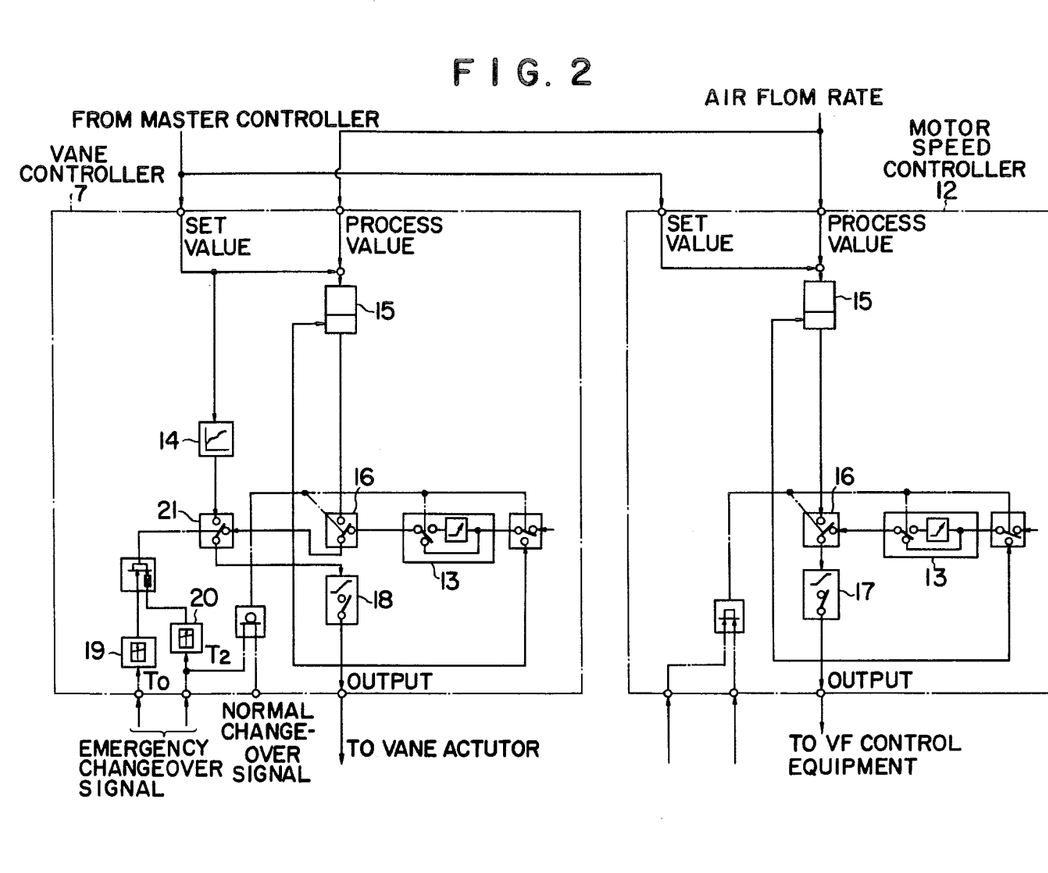
FIG. 2 is a circuit diagram indicating the inner organization of the digital-programmable adjusting controller respectively for inlet vane control and for speed control in the system shown in FIG. 1.

Examples of the internal circuit organizations of the vane controller 7 and the speed controller 12 are shown in FIG. 2. Each of these circuits 7 and 12 is provided with a constant changing rate computing circuit part 13, a PID adjustment part 15, and a vane/VF switching circuit part 16. The circuit 12 is provided further with a VF control signal part 17. The circuit 7 is provided further with a vane opening computing circuit part 14, a vane control signal part 18, a timer ($T_0$) 19 for fine adjustment of the vane 2, a timer ($T_2$) 20 for changeover from forced to normal control of the vane 2, and a vane signal forced/normal control switching circuit part 21.

Each of the PID adjustment parts 15 receives the detected flow rate signal from the detector 5 as well as a set flow rate signal from the master signal source. Each PID adjustment part 15, upon receiving these two signals in the form of the difference therebetween, performs proportional, integral and differential operations and sends out the result of the operations as an output. Each of the vane/VF switching circuits 16 receives and delivers selectively the output signal from the PID adjustment part 15 or the signal from the constant changing rate computing circuit part 13, depending upon which of the vane control mode and VF control mode is selected. The vane opening computing circuit part 14 is a function generator which receives the signal of the set value from the master controller and delivers an output signal indicating the degree of opening of the inlet vane. The function to be generated in this circuit part 14 represents the characteristic curve of the degree of opening of the inlet vane in relation to the air flow rate. The vane signal forced/normal control switching circuit part 21 receives and delivers selectively the signal from the vane/VF switching circuit part 16 or the signal from the vane opening computing circuit part 14. The thus selected output signal from the switching circuit part 21 is sent to the vane control signal part 18 the output of which is the output of the vane controller 7. The timer 19 is provided to adjust the timing of the vane throttling in the case of an emergency changeover or issue of a fault signal. The constant changing rate computing circuit part 13 is used to cause the inlet vane to move gradually into its full open position at a constant speed in the case of changover from vane control to VF control.

In the case of a forced control, the set air flow rate signal from the master controller is converted in the circuit part 14 into the signal of the degree of opening of the inlet vane, which latter signal is sent through the switching circuit part 21 and the vane control signal part 18 to become the output of the vane controller 7. Thus, a feed forward control is carried out.

In the case of a normal control, the signal of difference between the signal of the process value from the flow rate detector 5 and the signal of the set value from the master controller is subjected to proportional, integral and differential operations in the PID adjustment part 15, and the output from this adjustment part is sent through the switching circuit parts 16 and 21 to the vane control signal part 18, the output of which becomes the output of the vane controller 7. Thus, a feed back control is carried out in this case.

The ordinary method of controlling the switching from inlet vane control of the fan 3 in the above described control system to control of the fan speed will now be described. The synchronous changing over from operation of the fan 3 with the commercial power supply to that with the VF control equipment 8 is carried out in the following manner.

After it has been confirmed that the feedwater rate to the boiler is below a previously determined specified value, that the current of the motor of the fan is below a specified value, and that an induced draft fan which may be provided in the boiler flue is in operation or stopped, a changeover condition confirmation switch is turned "ON". Thereafter, the commercial/VF changeover switch is switched to the "commercial to VF" side, whereby a command for changeover from the commercial power supply 11 to the VF control equipment 8 is automatically issued, whereupon the switching contactors 8a and 8e become "ON", and the circuit breaker 9 for commercial power supply becomes "OFF". As a consequence, the motor 3a of the fan 3 is operated by the VF control equipment 8.

The speed of the fan 3 at this time is the same as that in the case of operation with the commercial power supply 11. Furthermore, while the air flow rate has been controlled by the inlet vane 2, a speed control operation indication lamp becomes lit together with the issuance of signal during operation by the VF control equipment 8, whereupon the control of the air flow rate by the inlet vane 2 is terminated, and the air flow rate control is changed over to that by the speed of the fan 3. As a result, the inlet vane 2 is rotated at a constant change rate to its fully-open position in response to a signal from the constant change rate computing circuit 13 of the vane controller 7, and the air flow rate is controlled at a constant value by only the speed of the motor of the fan 3.

More specifically: the air flow rate is detected by the flow rate detector 5 installed in the venturi 4 of the air duct 1; the resulting air flow rate signal is transmitted to the speed controller 12, where a speed of the motor matching a preset air flow rate is computed; and a corresponding signal is sent to the current-source inverter 8c of the VF control device 8. In the current type inverter 8c, this signal controls the frequency of the current sent to the motor 3a of the fan 3, the speed of which is thereby controlled, and the air flow rate is controlled at a set value.

Next, in the ordinary method of changing over from speed control to inlet vane control, the synchronous changeover from operation of the fan 3 by the VF control equipment 8 to operation by the commercial power supply 11 is carried out in the following manner.

Similarly as described hereinabove, when it is confirmed that the feedwater rate to the boiler is below a previously determined specified value, that the current of the motor of the fan is below a specified value, and that the induced draft fan is in operation or stopped, the changeover condition confirmation switch is turned "ON". Thereafter, the commercial/VF changeover switch is switched to the "VF to commercial" side, whereby a command for changeover from VF control equipment 8 to commercial power supply 11 is automatically issued. The control of the air flow rate due to the speed of the motor 3a of the fan 3 is thereupon terminated, and control is changed over to control of the air flow rate by the inlet vane 2.

As a result: the speed of the fan 3 rises in response to a signal from the constant changing rate computing circuit part 13 of the speed controller 12 and becomes the rated speed; the circuit breaker 9 for changeover to commercial power supply becomes "ON" after completion of synchronization of the two power supplies; the switching contactors 8a and 8e become "OFF"; whereupon the motor 3a of the fan 3 is operated by the commercial power supply 11. Together with the issuance of a signal during operation by the commercial power supply 11 from the control panel for commercial/speed changeover, a commercial operation indicating lamp is lit.

Furthermore, together with a rise in the fan speed, the air flow rate is controlled to be kept at a set value by the inlet vane 2. More specifically, the air flow rate is detected by the flow rate detector 5 installed on the venturi 4 of the air duct 1, and the resulting detection signal is sent to the vane controller 7, where the degree of vane opening corresponding to a preset air flow rate is computed. The resulting signal is sent to the vane actuator 6, the actuation quantity of which is thereby controlled, whereby the degree of opening of the inlet vane 2 is controlled, and the air flow rate is controlled to be kept at a set value.

Figure 3:
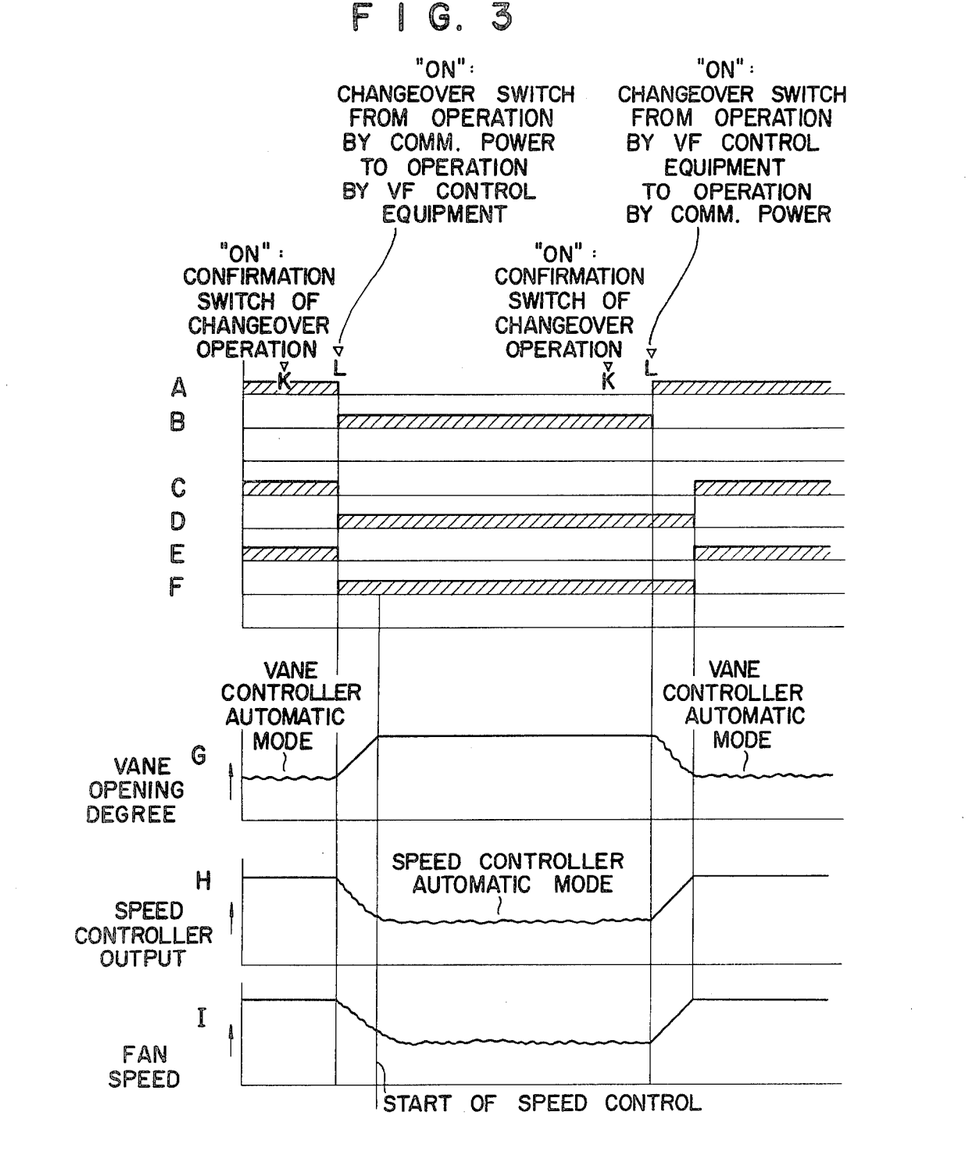
FIG. 3 is a time chart indicating variations of principal variables at the time of ordinary changeover of the control between speed control of the fan and control of degree of opening of the inlet vane.

A time chart of the above described normal changeover from operation of the fan 3 by the commercial power supply 11 to its operation by the VF control equipment 8 or the reverse changeover is shown in FIG. 3.

In FIG. 3: line A represents the command for changeover from operation by the VF control equipment 8 to operation by the commercial power supply 11; B represents the command for changeover from operation by the commercial power supply 11 to operation by the VF control equipment 8; C represents the operation of the above mentioned lamp indication by the commercial power supply; D represents the operation of a lamp indication by the VF control equipment 8; E represents a signal of operation by the commercial power supply 11; F represents a signal of operation by the VF control equipment 8; G represents the control output of the vane controller 7; H represents the control output of the speed controller 12; and I represents the speed of the fan 3.

Next, a method of emergency changeover from speed control to inlet vane control will be described. Emergency changeover from operation of the fan 3 by the VF control equipment 8 to operation by the commercial power supply is carried out in the following manner.

The changeover condition confirmation switch is turned on at K, and the switch for changeover between the inlet vane control and the VF control at L in the chart. When, unrelatedly to the boiler load, the operator turns the emergency switch for changing over from the VF control equipment 8 to the commercial power supply 11 to its "ON" position, or a fault signal is emitted from the control panel of the VF control equipment 8, a changeover command is automatically issued, whereby the switching contactors 8a and 8e of the control panel become "OFF". Simultaneously, the control of the air flow rate by the speed of the fan 3 is terminated, and the speed begins to decrease. One or two seconds immediately thereafter, changeover to control of the air flow rate by the inlet vane 2 takes place, thereby to actuate the vane actuator 6, the actuating speed of which has been previously raised. The inlet vane 2 is thereby closed compulsorily to a vane opening degree previously set by a signal generated by the vane opening computing circuit part of the vane controller 7, which degree of opening in the instant example is the vane position corresponding to the boiler load at the time of control of the air flow rate by the inlet vane 2.

After a time period ($T_1 = 3$ seconds, FIG. 4) for reduction of the motor residual voltage, the circuit breaker 9 for the commercial power supply 11 becomes "ON", and the fan motor 3a is operated by the commercial power supply 11, whereupon the fan speed increases until it becomes the rated speed. On the other hand, the forced closing operation of the inlet vane 2 is terminated after a preset period ($T_2 = 18$ seconds after switching on the commercial power supply, FIG. 4), and normal automatic air flow rate control by the inlet vane 2 is carried out.

This emergency changeover operation is indicated by the time chart in FIG. 4. In FIG. 4: line A represents the command for changeover from operation by the VF control equipment 8 to operation by the commercial power supply 11; B represents the command for changeover from operation by the commercial power supply 11 to operation by the VF control equipment 8; A' represents the command for emergency changeover from operation by the VF control equipment 8 to operation by the commercial powr supply 11; C represents the operation of the lamp indication by the commercial power supply 11; D represents the operation of the lamp indication by the VF control equipment 8; E represents a signal of operation by the commercial power supply 11; F represents a signal operation by the VF control equipment 8; F' represents a fault signal of the VF control equipment 8; G represents the control output of the vane controller 7; H represents the control output of the speed controller 12; and I represents the speed of the fan 3. $T_0$ designates the time period of fine adjustment of the throttling of the inlet vane 2. The switch for changeover between the inlet vane control and the VF control is operated at L, and the fault signal is emitted at L' in the chart.

In this connection, if the rate of throttling of the inlet vane 2 is slow, the resulting increase in the air flow will become a problem. Conversely, if the throttling rate is excessively rapid, the temporary reduction in the air flow rate will become a problem. In either case, there is the objectionable possibility of extinguishing of the burner flame of the boiler and stoppage of the boiler. Accordingly, in the instant example, adjustment is made possible in the period $T_0$, and continuation of stable combustion is realized.

Figure 5:
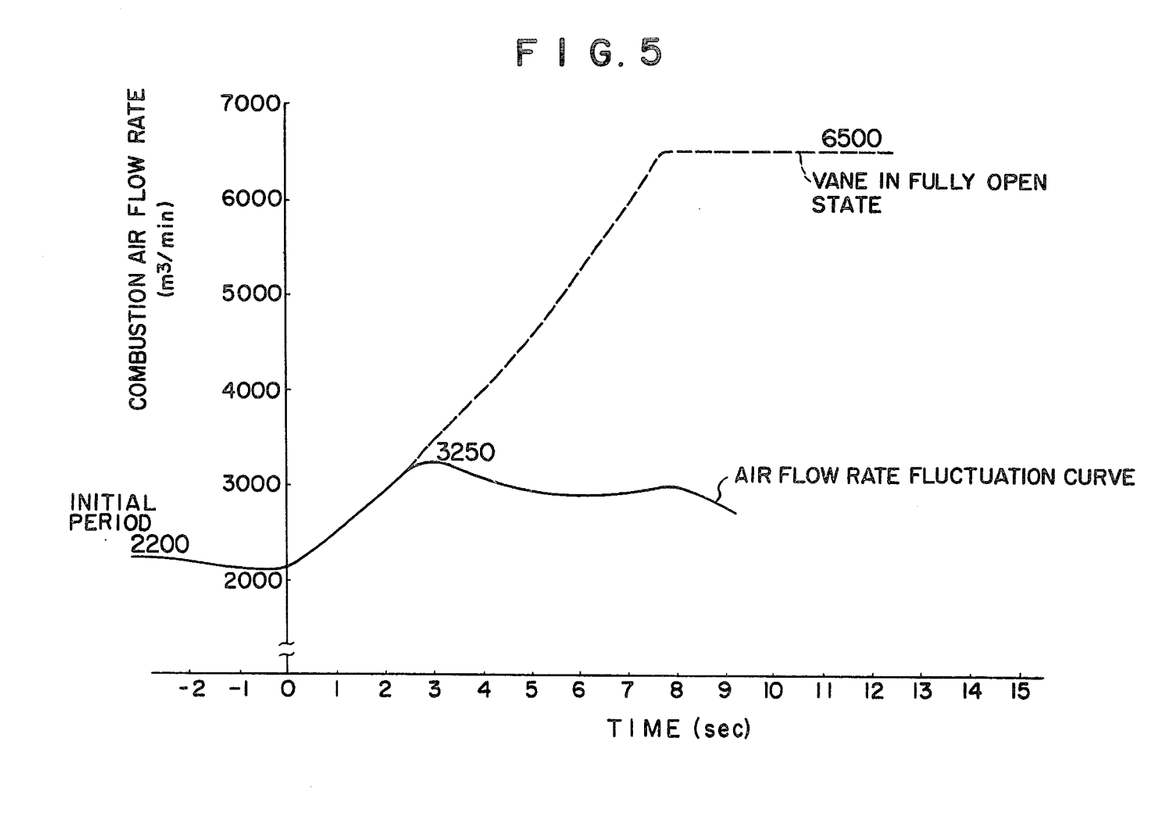
FIG. 5 is a graph indicating a simulation of fluctuation of the air flow rate at the time of emergency changeover between fan speed control and inlet vane opening control.
Figure 6:
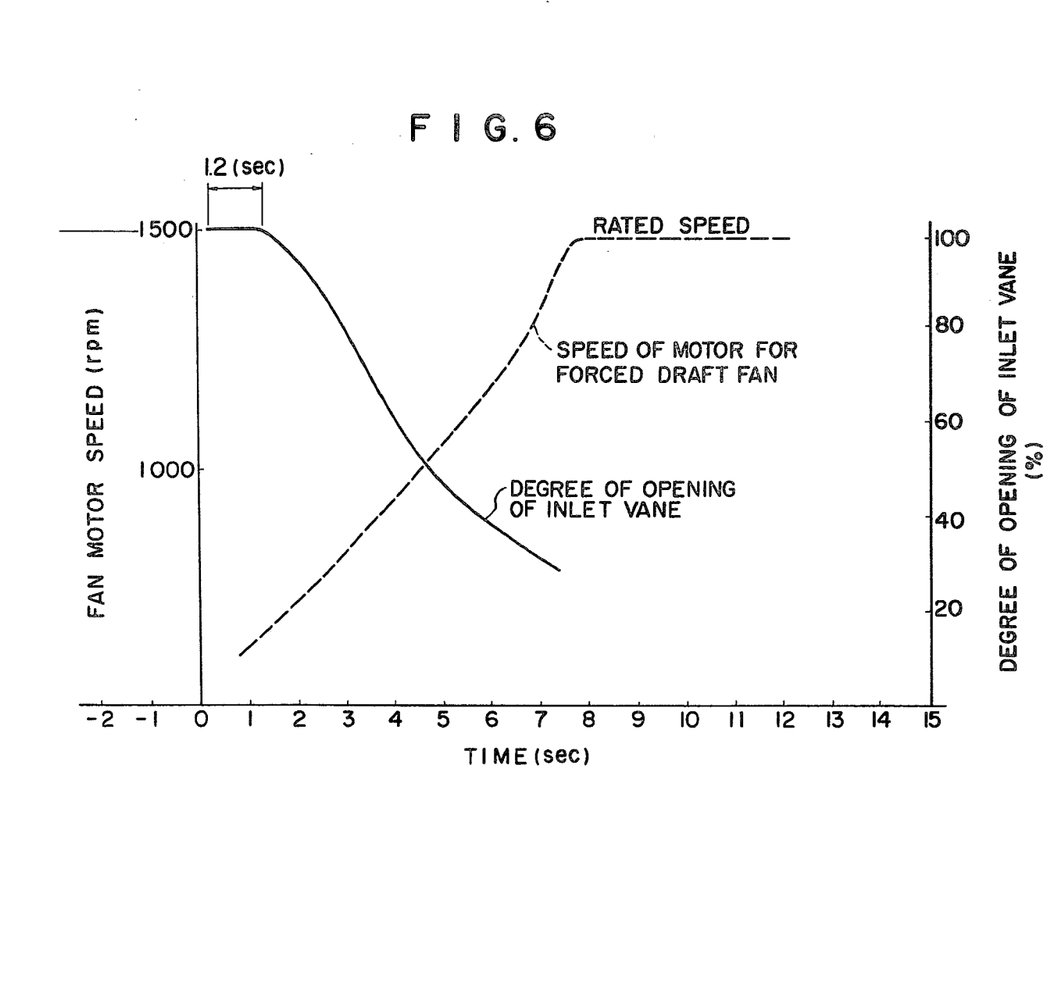
FIG. 6 is a graph indicating the variations with time of the inlet vane opening and the fan speed at the time of emergency changeover.

A simulation of fluctuations of the air flow rate with time at the time of emergency changeover as described above is shown in FIG. 5. The variations of the degree of opening of the inlet vane 2 and the fan speed with time are indicated in FIG. 6. As is apparent from these FIGS. 5 and 6, large fluctuations of the air flow rate at the time of emergency changeover are being avoided.

Thereafter the VF control equipment 8 is reset, and, at that instant, the operation of the fan 3 is changed over from that by the commercial power supply to that by the VF control equipment 8, thereby returning the control of the air flow rate from that by the inlet vane 2 to that by the speed of the fan 3.

In this connection, in the method of controlling the fan air flow rate according to this invention, the operational speed of the vane actuator 6 is raised beforehand for the purpose of emergency changeover. As specific means for this measure, a booster relay is additionally provided in the piping system in the case where a pneumatic type actuating cylinder is used for the vane actuator 6, and, in the case of an electrical drive, a rapidly opening/closing motor is used.

In the instant example, a VF control equipment 8 in which a current-source inverter is used has been described, but the method of the invention can be applied to any variable-speed control equipment, including a primary frequency controller such as a voltage-source inverter. Furthermore, while the foregoing description has concerned emergency changeover to a commercial power supply, the method of the invention can be applied in also in a parallel redundant operation system or a standby back up system of the variable-speed control equipment.

The method of controlling the air flow rate of a fan of this invention is applicable not only to the case of a fan or blower for a boiler but also to fans or blowers in various kinds of other equipments and/or plants.

In order to indicate more fully the nature and utility of this invention, the following examples of practice thereof in the case of application of the method of controlling the air flow rate of a fan according thereto to actual fans for boilers are set forth, it being understood that these examples are presented as illustrative only and are not intended to limit the scope of the invention.

EXAMPLE 1

Figure 7:
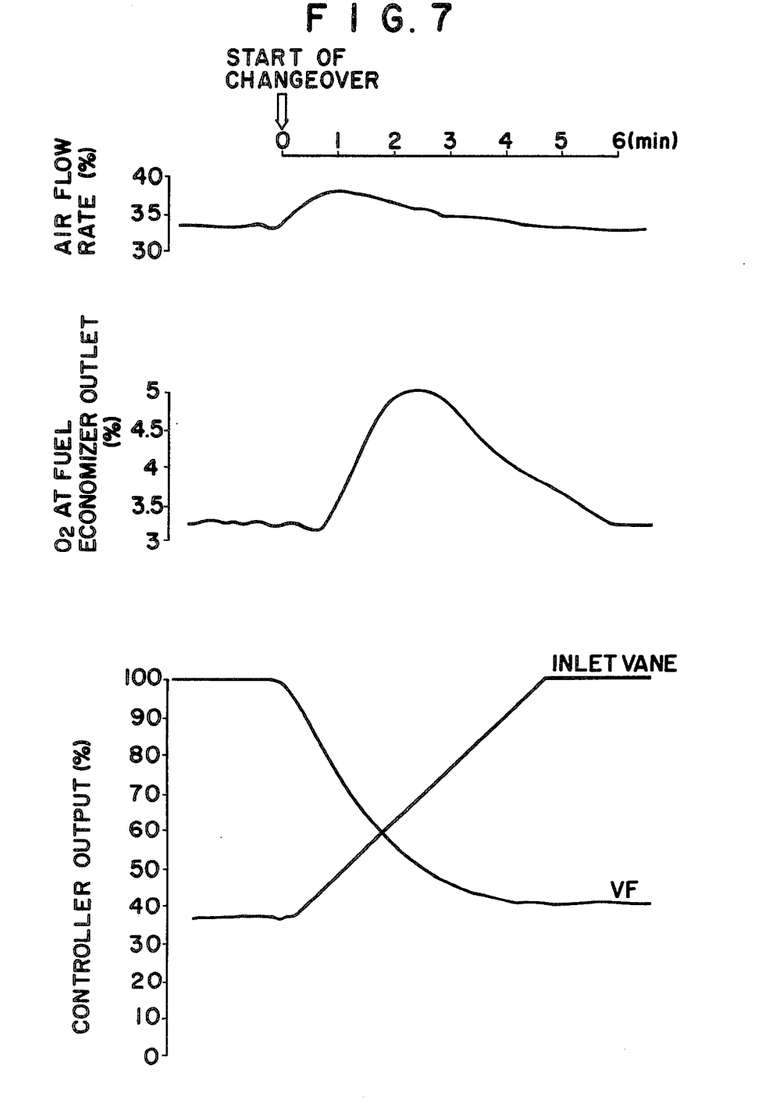
FIG. 7 is a graph indicating actual variations in a synchronous changeover test (boiler steam output 135 metric ton/hr.) from inlet vane control to fan speed control.

By using the air flow control method of this invention, and under a boiler capacity of 135 metric ton/hr, a synchronous changeover test from operation by commercial power supply to speed control operation was carried out. The relationships between the principal test variables and time are indicated in FIG. 7. The test conditions were an excess air ratio of 0.9, a fan outlet draft of 120 mm Aq, and a C-heavy oil (Japanese Industrial Standards, JIS) consumption rate of 10 kl/hr.

The air flow rate rose from 33% to 38% (the maximum reading of the flow meter is taken as 100%), and the oxygen concentration in the flue gas at the outlet of the fuel economizer rose from 3.2% in the stable state temporarily to 5.0%. The flame shape also became short but quickly recovered, and the combustion was promptly returned to its stable state. During this changeover, the steam pressure at the boiler outlet was continually maintained at 120 kg/cm$^2$, and the steam temperature at the boiler outlet was similarly maintained constant at 530° C.

EXAMPLE 2

Figure 8:
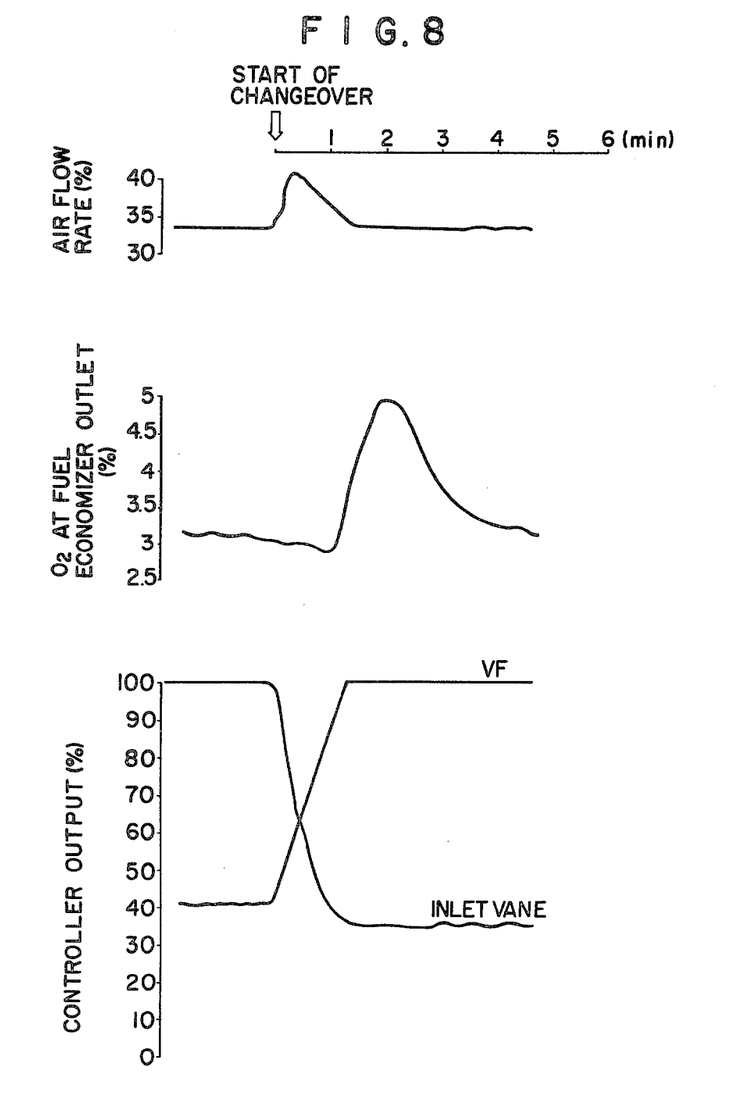
FIG. 8 is a similar graph indicating actual variations in a synchronous changeover test (boiler steam output 135 metric ton/hr.) from fan speed control to inlet vane control.

By the air flow rate control method of this invention, a synchronous changeover test from operation under speed control to operation by the commercial power supply was carried out with the boiler operating under the load of a steam generation rate of 130 metric ton/hr. The variations of the principal test variable with time are indicated in FIG. 8. The test conditions were the same as those in Example 1.

The air flow rate rose from 38% to 41%, and the oxygen concentration in the flue gas at the outlet of the fuel economizer rose from 3.2% in the stable state temporarily to 5.0%. The flame shape also became short but quickly recovered, and the combustion was promptly returned to its stable state. During this changeover, the steam pressure at the boiler outlet was continually maintained at 120 kg/cm$^2$, and the steam temperature at the boiler outlet was similarly maintained constant at 530° C.

EXAMPLE 3

Figure 9:
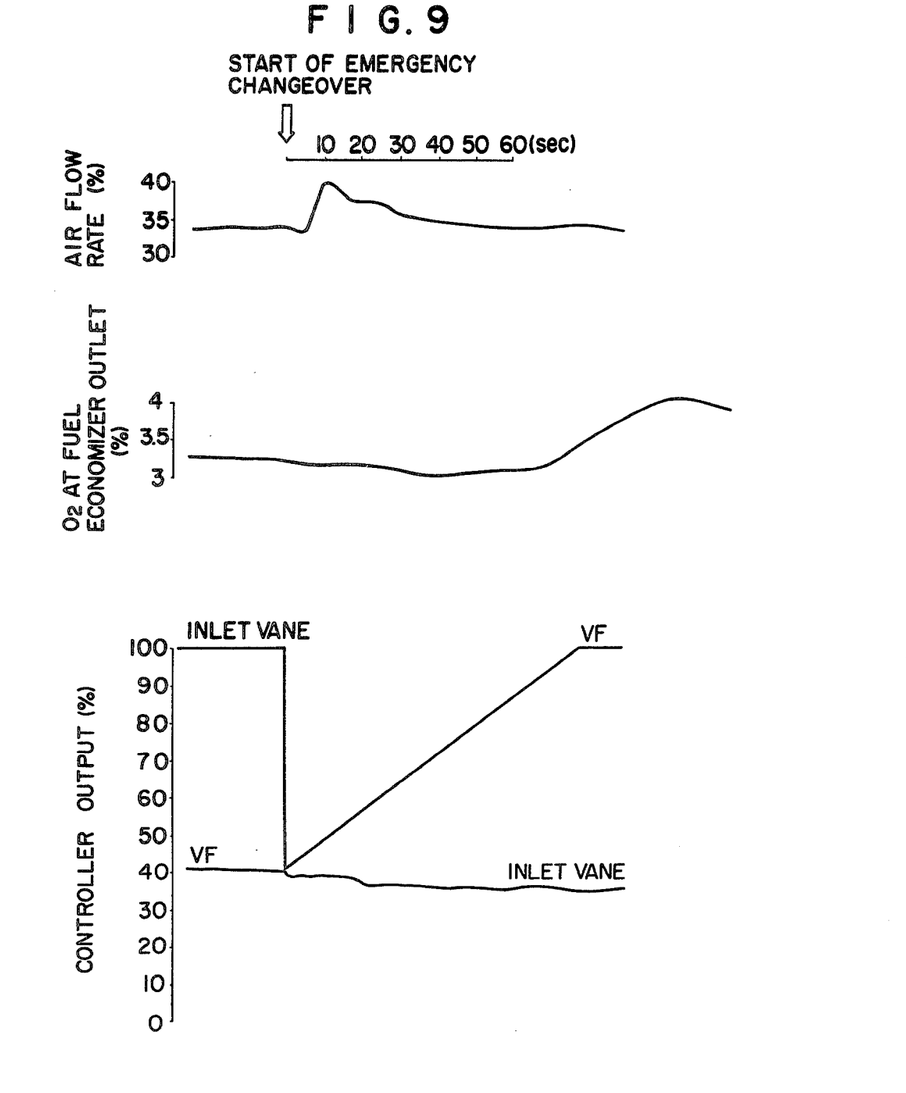
FIG. 9 is a similar graph indicating actual variations in an emergency changeover test (boiler steam output 135 metric ton/hr.) from fan speed control to inlet vane control.

By the air flow rate control method of this invention, an emergency changeover test from operation under speed control to operation by the commercial power supply was carried out with the boiler operating under the load of a steam generation rate of 130 metric ton/hr. The variations of the principal test variables with time are indicated in FIG. 9. The test conditions were the same as those in Examples 1 and 2.

The air flow rate started from 33.5%, decreased to a minimum of 32%, and rose to a maximum of 39.5%. The oxygen concentration in the flue gas at the outlet of the fuel economizer rose from 3.3% in the stable state temporarily to 4.1%.

This emergency changeover is the most severe test with respect to combustion, and the flame also shortened instantaneously but recovered a few seconds later, and the combustion became stable. The results obtained indicated that the variations of the oxygen concentration and the concentration of nitrogen oxides at the outlet of the fuel economizer are less than those at the time of synchronous changeover. Furthermore, during this emergency changeover, the steam pressure and temperature at the boiler outlet were maintained at constant values of 120 kg/cm$^2$ and 530° C., respectively.

EXAMPLE 4

Figure 10:
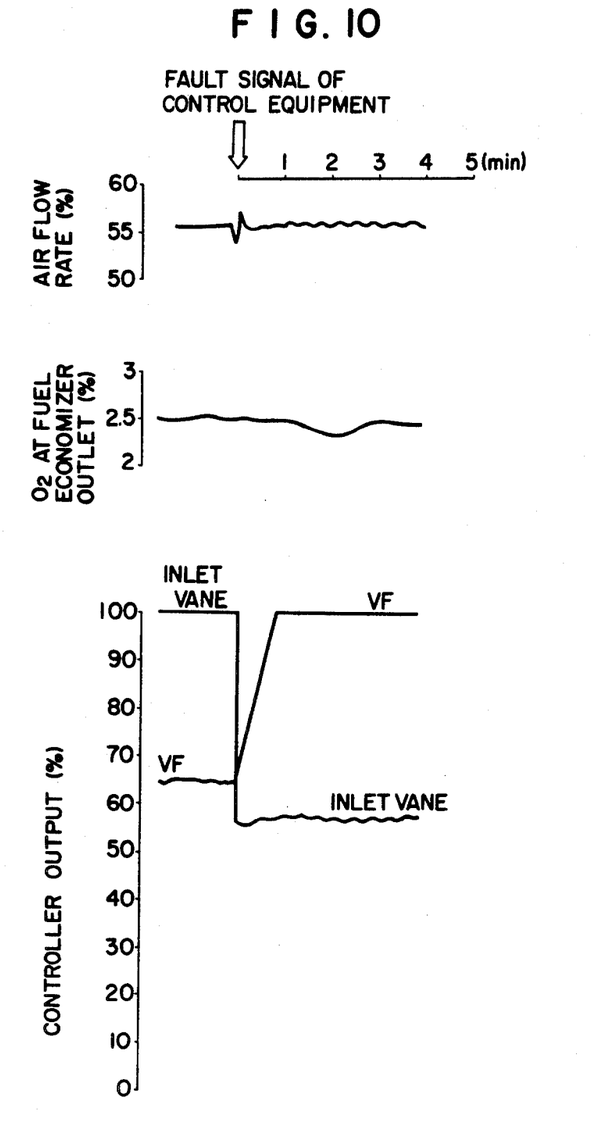
FIG. 10 is a similar graph indicating results of an emergency changeover test (boiler steam output 240 metric ton/hr.) from fan speed control to inlet vane control.

By the air flow rate control method of this invention, an emergency changeover test from operation under speed control to operation by the commercial power supply was carried out with the boiler operating under the load of a steam generator rate at 240 metric ton/hr. The variations of the principal test variables with time are indicated in FIG. 10. The test conditions were an excess air ratio of 0.95, a fan outlet draft of 180 mm. Aq, a C-heavy oil (JIS) consumption rate of 17 kl/hr., and a two-stage combustion air flow rate of 19%.

The air flow rate decreased instantaneously from 56%, becoming 53.5%, thereafter rose instantaneously to 57.5%, and then quickly returned to a stable state of 56%. The oxygen concentration in the gas at fuel economizer outlet decreased temporarily from a stable state at 2.5% to 2.3% and then returned after approximately one minute. The concentration of nitrogen oxides at fuel economizer outlet was maintained at a constant value of 160 ppm. The flame shape underwent almost no variation, and stable combustion was sustained. The steam pressure and temperature at the boiler outlet were maintained at their respective stable values of 120 kg/cm$^2$ and 530° C.

As described in detail above, this invention provides a method of controlling the air flow rate of a fan by alternately changing over between rotational speed control of the fan by means of a primary frequency control equipment and control of an inlet vane, in which method, when the primary frequency control equipment generates a fault signal, or when an emergency changeover command is issued by the operator, an inlet vane actuator whose operating speed has been elevated beforehand (the operating speed from fully open to fully closed being 23 to 16 seconds) is compulsorily closed to a preset degree of opening, and, after a preset time period, the control is shifted to inlet vane control.

Accordingly, at the time of occurrence of a fault, there is little fluctuation in the rate of flow of air to the apparatus or plant, such as a boiler, being supplied with the air, whereby, in the case of a boiler, the combustion is maintained stable, and continuous operation of the boiler is made possible. Furthermore, a great saving in energy due to reduction of power required for driving the fan is realized, and, moreover, the reliability of fan control is remarkably increased.

What we claim is:

1. A method of controlling the air flow rate of a fan with the use of a system for controlling the air flow rate of the fan, which system comprises adjustable speed control means of a motor for driving the fan, commercial power supply circuit means provided in parallel with the adjustable speed control means, and control circuit means for controlling the degree of opening of an inlet vane of the fan, said system controlling the fow rate by changing over between adjustable speed control of the motor and control of the inlet vane, said method comprising the steps of stopping the adjustable speed control means during operation of the motor by the adjustable speed control means with the inlet vane in fully open state, simultaneously throttling the inlet vane at a preset speed to a degree of opening appropriate for the load by means of said control circuit means, and, after a time period necessary for reduction of residual voltage of the motor, changing over to operation by the commercial power supply thereby to shift to control by the inlet vane.

2. A method of controlling the air flow rate of a fan according to claim 1 in which the adjustable speed control means is stopped in response to a fault signal therefrom.

3. A method of controlling the air flow rate of a fan according to claim 1 in which the inlet vane is throttled by means of vane actuator means the operational speed of which is raised beforehand for the purpose of emergency changeover.

* * * * *

UNITED STATES PATENT AND TRADEMARK OFFICE
CERTIFICATE OF CORRECTION

PATENT NO. : 4,468,171

DATED : August 28, 1984

INVENTOR(S) : Haruo Katsumata, Takeshi Matsuya, Hitoshi Saitoh, Shigeru Yasuki, Yukio Sato, Masaru Osaki, Minoru Komeno, Takayuki Arai, Shigeki Ochi, and Tatsuo Ino It is certified that error appears in the above-identified patent and that said Letters Patent is hereby corrected as shown below:

Column 10, line 59, for "fow" read --flow--.

Signed and Sealed this

Twenty-third Day of April 1985

[SEAL]

Attest:

DONALD J. QUIGG

Attesting Officer

Acting Commissioner of Patents and Trademarks